July 28, 1931. L. ROLLAND 1,816,401
SHOCK ABSORBING DEVICE
Filed Jan. 25, 1929  3 Sheets-Sheet 1
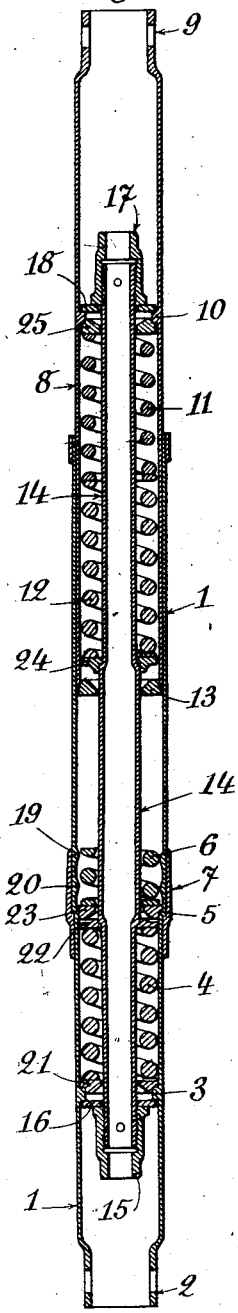
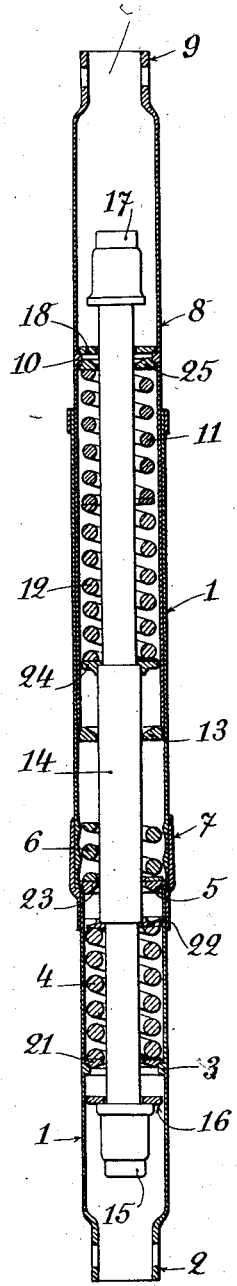
L. Rolland
INVENTOR
By: Marks & Clerk
ATTYS.

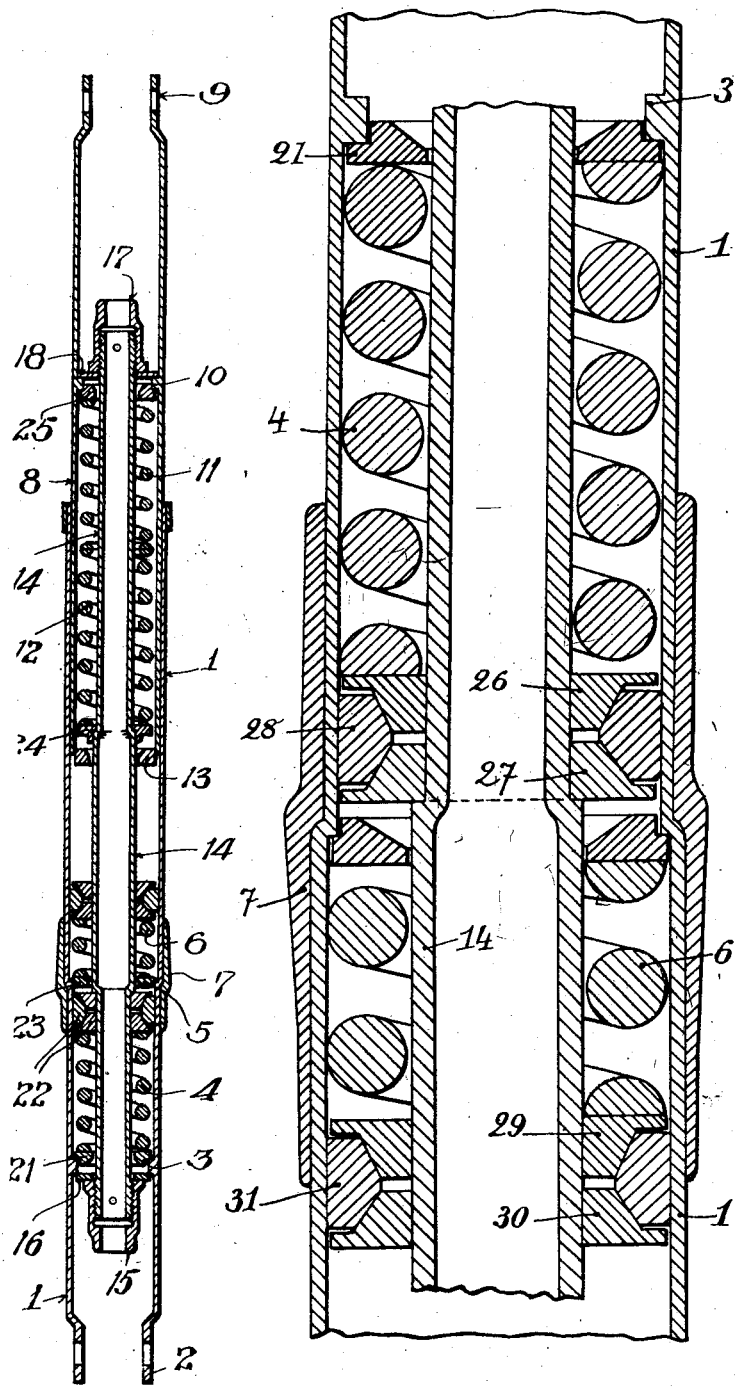

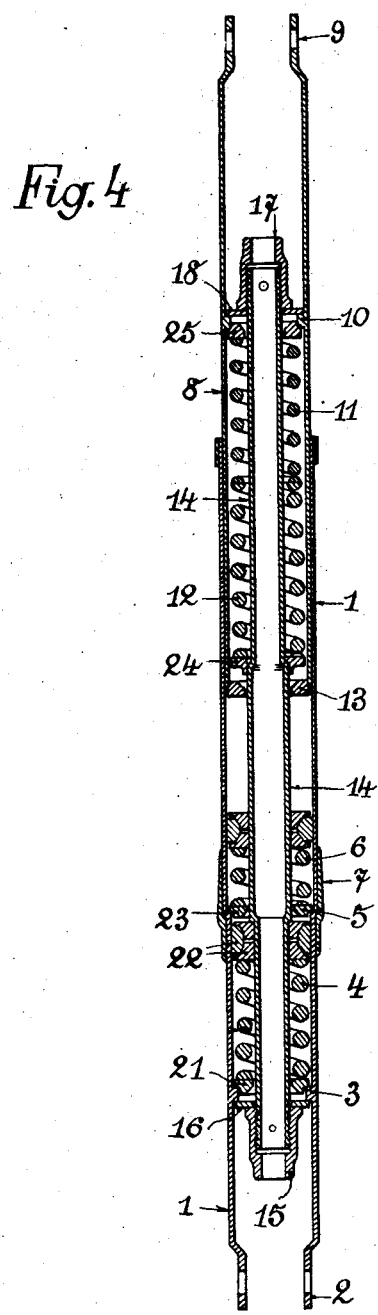

Patented July 28, 1931

1,816,401

UNITED STATES PATENT OFFICE

LOUIS ROLLAND, OF PARIS, FRANCE, ASSIGNOR TO SOCIÉTÉ METALLURGIQUE DE L'ARIEGE, OF PARIS, FRANCE

SHOCK ABSORBING DEVICE

Application filed January 25, 1929, Serial No. 334,977, and in France February 1, 1928.

For the construction of aeroplane landing gear, there are commonly employed elastic elements such as the well-known sandow cords or rings. However, such elements are no longer sufficient with the modern aeroplanes of constantly increasing weight, which are often obliged to land upon irregular ground, so that hydraulic, pneumatic or other devices are now employed.

The present invention relates to a shock absorber which consists of telescoping tubes containing a set of coiled springs so disposed as to provide a shock absorber with gradual action and high power, whereby complete safety and simple and invariable functioning are obtained, and the device is also light and readily mounted.

The appended drawings show by way of example an embodiment of the said invention, as well as a modification.

Fig. 1 is a lengthwise section of the apparatus in the inoperative position.

Fig. 2 is a like view in the operative position.

Fig. 3 is a sectional view of modifications of certain parts of the apparatus.

Figure 4 is a longitudinal cross sectional view of a device according to the invention embodying the modifications indicated in Fig. 3.

In Figs. 1 and 2, the lower part of the apparatus consists of a weldless steel tube 1 connected to the axle of the landing gear by a coupling member 2. The said tube contains a shoulder 3 for an abutment spring 4 and a shoulder 5 for an impact spring 6.

The shoulder or seating 5 is strengthened by a ring 7 which surrounds the bosses or ramps 19—20 in the tube 1.

In the said tube 1 is slidable the upper part of the apparatus which consists of a tube 8 which can be attached to the fuselage by connecting means 9. In the tube 8 is a seating 10 for the elastic spring 11—12. At the lower end of the tube 8 is mounted a ring 13 whereby the said spring 6 is compressed at the end of the stroke.

The springs 11 and 12 are connected to the said spring 4 by a central cross-braced tube 14 which traverses the springs and carries at the ends the supporting washer 16—18 and the nuts 15—17 for adjusting the stroke.

The said tube 14 also substantially connects the two uprights 1 and 8 together when the absorber is suspended during the flight.

The washers (simple or flanged) 13—21—22—23—24—25 support the different springs.

The operation is as follows:

When the aeroplane first makes contact with the ground, its weight at once compresses the said springs 11—12 carried by the abutment spring 4. Since none of the springs have been initially compressed, the smallest load will at once commence the compression and will store up energy of an antagonistic nature by the use of the inclined places. When the aeroplane lands without abnormal shock, the partial compression of the springs 11—12—4 will suffice to support the aeroplane. When the aeroplane lands more abruptly, the springs 11—12—4 will now be further compressed, but the said spring 6 will not act. The force of expansion of the spring 4 is absorbed by the ramps 19—20 or by suitable inclined planes which convert the kinetic energy into antagonistic energy.

A very hard landing is in fact necessary in order that the springs 11—12—4 will be sufficiently compressed to allow the abutment 13 to make contact with the said spring 6. The compression of said spring places its spiral turns in contact with the ramps 19—20, so that the spring is obliged to contract in the diametrical direction. On the return movement, the said ramps absorb the expansion force of said spring 6, or by means of inclined planes, the kinetic energy will be converted into antagonistic energy.

If the shock of a sudden landing is very violent, and thus exceed the capacity of the said springs by compressing them to the maximum degree, the tubes 1 and 8 will compress between them the said spring 6, and herein the apparatus forms a rigid upright device and will support a load whose limit is represented by the compression load of a tubular column whose cross section is that of the uprights.

The effort on the central tube 14 can in no wise exceed the normal load, since the strokes are so regulated as to prevent the complete compression of the said spring 4 which thus has a certain elasticity, this being applied to the central tube whereby it is relieved from all overload.

In the modification shown in Fig. 3, the ramps 19—20 are eliminated, but the washer 22 in contact with the said spring 4 is replaced by two tapered rings 26—27 having between them a groove containing the packing rings 28 which have tapered bearing surfaces. The thickness of the said rings 26—27 is such that they will only come together when the said rings 28 make contact with the wall of the tube 1, that is, when they have the maximum spacing.

A like device comprising rings 29 and 30 and packing rings 31 is mounted on the said spring 6.

The operation is as follows:

Under the action of the kinetic energy F, the springs 4 and 6 are compressed by means of the said rings 26—27—29—30 which oblige the packing rings 28—31 to separate and to bear by friction upon the wall of said tube 1, thus producing an antagonistic force which will act against the expansion of the said springs 4—6.

The inclination of the tapered parts is such as to multiply the kinetic energy F by two, three or four into frictional antagonistic energy according to needs.

Since the said springs 4—6 have a stroke equivalent to that of the kinetic energy, the braking device will thus have the same stroke.

As the maximum power is obtained when the springs 4 and 6 are completely compressed, if it is desired to increase the force of the braking device, this will be limited only by the resistance of the casing to a permanent distortion.

If however it is desired to increase the kinetic energy F without increasing the braking power, with the springs entirely compressed or not, it is simply necessary to fill the space between said tapered washers by a suitable ring.

When the kinetic energy F ceases to act, the packing rings 28—31, under the action of the force stored up by the compression of the springs, will gradually expand and will attain their original position.

A device comprising two different tapered members will much facilitate the initial release of the device under a very small shock.

It is thus apparent that the said apparatus has a great strength in spite of its reduced weight.

All of the parts are proof against wear and have an invariable shape. Their operation is automatic. Even should a spring break, the apparatus will remain in the state of normal functioning.

The contact points descend to the maximum in the direction of the solid base for attaching the axle, and this construction provides at the time of the maximum flexion, a resistance to which is added the thickness of said tube 8 whose end 13 will much exceed the centre of the apparatus wherein is situated the maximum flexion couple.

The adjustment of the flexion of the said nuts 15—17 is very exact.

In the event of a sudden landing, the device will entirely prevent the reaction impact of the said springs 4 and 6, due to the fact that the ramps 19—20 (or inclined planes) absorb its kinetic energy of expansion, and also due to the fact that the very short stroke of the spring 6 at once releases the shock absorber from its reaction, as the other springs are always under compression by the weight on the aeroplane.

The great responsiveness of the apparatus is due to the spacing between the points of contact, for this spacing will in fact provide three absorbers on a common base, whereof the first bears upon a movable support and the other two upon fixed supports.

By reason of this great responsiveness, the aeroplane will remain close to the ground as soon as it lands, since the smallest load is at once absorbed by the springs which are quite free.

No initial compression is thus required.

Further, the absorption of the back-acting kinetic energy will prevent all jumping of the aeroplane. All shocks due to rough ground are absorbed by the action of the said shock absorbers.

Claims:

1. A shock absorber for airplanes and similar purposes, which comprises a pair of telescopic tubes slidable within one another, a member adapted to slide along the axis of the said tubes, each of the said tubes and the sliding member being provided with a pair of abutment shoulders, one shoulder of the sliding member being located between the outer and the inner shoulders of the inner telescopic tube while the other shoulder of the said sliding member is located between the outer and the inner shoulders of the outer telescopic tube, and three coil springs respectively arranged between the inner shoulders of both tubes, between the outer shoulder of the inner telescopic tube and the related shoulder of the said sliding member and between the outer shoulder of the outer telescopic tube and the related shoulder of the sliding member.

2. A shock absorber for airplanes and similar purposes, which comprises a pair of telescopic tubes slidable within one another, a member adapted to slide along the axis of the said tubes, each of the said tubes and the sliding member being provided with a pair of abutment shoulders, one shoulder of the sliding member being located between the outer and the inner shoulders of the inner telescopic tube while the other shoulder of the said sliding member is located between the outer and the inner shoulders of the outer telescopic tube, and three coil springs respectively arranged between the inner shoulders of both tubes, between the outer shoulder of the inner telescopic tube and the related shoulder of the said sliding member and between the outer shoulder of the outer telescopic tube and the related shoulder of the sliding member, the last mentioned of the said springs being adapted to always bear against both the shoulders between which they are interposed, and the first mentioned spring being shorter than the distance between the two inner shoulders of the telescopic tubes when no axial thrust urges the said tubes toward each other.

3. A shock absorber for airplanes and similar purposes, which comprises a pair of telescopic tubes slidable within one another, a member adapted to slide along the axis of the said tubes, each of the said tubes and the sliding member being provided with a pair of abutment shoulders, one shoulder of the sliding member being located between the outer and the inner shoulders of the inner telescopic tube while the other shoulder of the said sliding member is located between the outer and the inner shoulders of the outer telescopic tube, and three coil springs respectively arranged between the inner shoulders of both tubes, between the outer shoulder of the inner telescopic tube and the related shoulder of the said sliding member and between the outer shoulder of the outer telescopic tube and the related shoulder of the sliding member, the said sliding member moreover being provided with two additional shoulders located beyond the outer shoulders of the telescopic tubes and adapted to limit the outward movement of the latter under the action of the related springs.

4. A shock absorber for airplanes and similar purposes, which comprises a pair of telescopic tubes slidable within one another, a member adapted to slide along the axis of the said tubes, each of the said tubes and the sliding member being provided with a pair of abutment shoulders, one shoulder of the sliding member being located between the outer and the inner shoulders of the inner telescopic tube while the other shoulder of the said sliding member is located between the outer and the inner shoulders of the outer telescopic tube, and three coil springs respectively arranged between the inner shoulders of both tubes, between the outer shoulder of the inner telescopic tube and the related shoulder of the said sliding member and between the outer shoulder of the outer telescopic tube and the related shoulder of the sliding member, braking means between the said sliding member and one of the telescopic tubes, comprising a first tapered ring adapted to bear against a shoulder on the said sliding member, an additional tapered ring between the first ring and the spring located between the said shoulder of the sliding member and the outer shoulder of the said telescopic tube, and wedge-like members between the said rings and the wall of the said telescopic tube, substantially as described and for the purpose set forth.

In testimony whereof I have hereunto affixed my signature.

LOUIS ROLLAND.